United States Patent
Van Der Wiel (10) Patent No.: US 9,989,409 B2
(45) Date of Patent: Jun. 5, 2018

(54) IR SENSOR FOR IR SENSING BASED ON POWER CONTROL

(71) Applicant: MELEXIS TECHNOLOGIES NV, Tessenderlo (BE)

(72) Inventor: Appolonius Jacobus Van Der Wiel, Duisburg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 214 days.

(21) Appl. No.: 14/964,927

(22) Filed: Dec. 10, 2015

(65) Prior Publication Data

US 2016/0169738 A1   Jun. 16, 2016

(30) Foreign Application Priority Data

Dec. 15, 2014   (GB) .................................. 1422235.0

(51) Int. Cl.
  *G01J 1/42*   (2006.01)
  *G01J 1/16*   (2006.01)
  (Continued)

(52) U.S. Cl.
  CPC ........... *G01J 1/4228* (2013.01); *G01J 1/1626* (2013.01); *G01J 5/024* (2013.01); *G01J 5/0225* (2013.01);
  (Continued)

(58) Field of Classification Search
  CPC ...... G01J 1/4228; G01J 1/1626; G01J 5/0225; G01J 5/024; G01J 5/0285; G01J 5/045;
  (Continued)

(56) References Cited

U.S. PATENT DOCUMENTS 4,449,091 A * 5/1984 Otoi ................... G05D 23/1913
                                                           323/236
5,645,349 A * 7/1997 Fraden ..................... G01J 5/20
                                                           374/120
(Continued)

FOREIGN PATENT DOCUMENTS

| JP | H09264784 A | 10/1997 |
| JP | 2003247892 A | 9/2003 |
| WO | 9901726 A1 | 1/1999 |

OTHER PUBLICATIONS

European Search Report from corresponding EP Application No. EP15198490.3, dated May 20, 2016.
(Continued)

*Primary Examiner* — David Porta
*Assistant Examiner* — Blake Riddick
(74) *Attorney, Agent, or Firm* — Workman Nydegger (57) ABSTRACT

A semiconductor device for measuring IR radiation is disclosed. It comprises a substrate and a cap enclosing a cavity, a sensor pixel in the cavity, comprising a first absorber for receiving said IR radiation, a first heater, first temperature measurement means for measuring a first temperature; a reference pixel in the same cavity, comprising a second absorber shielded from said IR radiation, a second heater, and second temperature measurement means for measuring a second temperature; a control circuit for applying a first/second power to the first/second heater such that the first temperature equals the second temperature; and an output circuit for generating an output signal indicative of the IR radiation based on a difference between the first and second power.

20 Claims, 3 Drawing Sheets

(51) Int. Cl.
*G01J 5/02* (2006.01)
*G01J 5/04* (2006.01)
*G01J 5/06* (2006.01)
*G01J 5/12* (2006.01)
*G01J 5/14* (2006.01)
*G01J 5/20* (2006.01)

(52) U.S. Cl.
CPC ............ *G01J 5/0285* (2013.01); *G01J 5/045* (2013.01); *G01J 5/06* (2013.01); *G01J 5/061* (2013.01); *G01J 5/12* (2013.01); *G01J 5/14* (2013.01); *G01J 5/20* (2013.01); *G01J 2005/063* (2013.01); *G01J 2005/065* (2013.01); *G01J 2005/066* (2013.01); *G01J 2005/068* (2013.01)

(58) Field of Classification Search
CPC ...... G01J 5/06; G01J 5/061; G01J 5/12; G01J 5/14; G01J 5/20; G01J 2005/063; G01J 2005/065; G01J 2005/066; G01J 2005/068
USPC ................. 250/338.1, 339.02, 338.4, 339.03
See application file for complete search history.

(56) References Cited

U.S. PATENT DOCUMENTS

| | | | |
|---|---|---|---|
| 6,583,416 B1* | 6/2003 | Villani | G01J 5/06 250/332 |
| 2006/0062439 A1* | 3/2006 | Setlak | G06K 9/0004 382/124 |
| 2006/0279734 A1* | 12/2006 | Yan | G02B 6/12026 356/329 |
| 2007/0069133 A1 | 3/2007 | Dewames et al. | |
| 2007/0108388 A1* | 5/2007 | Lane | G01J 1/04 250/353 |
| 2007/0120060 A1* | 5/2007 | Lane | G01J 1/04 250/353 |
| 2007/0138394 A1* | 6/2007 | Lane | G01J 1/04 250/353 |
| 2007/0138395 A1* | 6/2007 | Lane | G01J 1/04 250/353 |
| 2007/0235440 A1* | 10/2007 | Gu | H05B 1/0244 219/482 |
| 2007/0262407 A1 | 11/2007 | Schimert et al. | |
| 2008/0081769 A1* | 4/2008 | Hassibi | C40B 30/04 506/9 |
| 2009/0207879 A1 | 8/2009 | Kurasina | |
| 2013/0306851 A1 | 11/2013 | Le Noc et al. | |
| 2014/0091220 A1* | 4/2014 | Li | G01J 5/20 250/340 |
| 2015/0102024 A1* | 4/2015 | Barfuss | B62D 1/046 219/204 |
| 2015/0177069 A1* | 6/2015 | Maes | G01J 5/023 374/121 |
| 2015/0177070 A1* | 6/2015 | Maes | G01J 5/023 374/121 |
| 2015/0369669 A1* | 12/2015 | Kassovski | G01J 5/16 250/338.3 |
| 2017/0003172 A1* | 1/2017 | Maes | G01J 5/16 |

OTHER PUBLICATIONS

Great Britain Search Report from corresponding GB Application No. 1422235.0, dated May 20, 2015.

* cited by examiner

IR SENSOR FOR IR SENSING BASED ON POWER CONTROL

FIELD OF THE INVENTION

The invention relates to the field of semiconductor devices and methods for sensing infrared (IR) radiation. More in particular, the invention relates to such devices which use one or more sensor pixels and a reference pixel.

BACKGROUND OF THE INVENTION

Thermal IR sensors and methods of measuring IR radiation by means of semiconductor circuits, in particular by making use of MEMs structure suspended in a cavity, and comprising a temperature sensor, are well known in the art.

Most IR sensors transfer an incoming IR signal into a temperature increase of a thermally isolated structure (referred to herein as "absorber") arranged for absorbing the IR radiation. The absorber is typically a so called membrane or diaphragm suspended in a sealed cavity by means of a suspension structure (e.g. long and thin beams). The more IR-power the isolated structure receives, the higher the temperature of the absorber will be with respect to the bulk (substrate and cap). For each amount of IR radiation, there is an equilibrium temperature at which the heating-up due to the incident IR power equals the heat loss from the absorber to the surrounding substrate and cap via heat conduction, heat convection and heat radiation. The temperature increase of the absorber is thus an indication of the amount of incident IR radiation, and is typically measured by means of a resistor with a high temperature dependence (bolometer) or by means of a series of thermocouples (thermopile). In this document the heat absorber with temperature sensor is referred to as a "pixel".

For good sensitivity of the pixel, the temperature output signal would preferably be as large as possible for a given amount of IR-radiation power. The sensitivity of such a pixel is determined by three physically different gain factors: The first factor is determined by absorption and reflection of the IR light through the lid or cap onto the absorber. The second gain factor is determined by the thermal heat resistance between the absorber and the bulk of the device. This second factor especially depends on the heat resistance through the suspension structure (e.g. beams) of the thermally isolated structure and the heat resistance through the surrounding gas. The third factor is determined by the thermometer which is typically a resistor with high temperature dependence or a series of thermocouples (thermopile).

Figure 1:
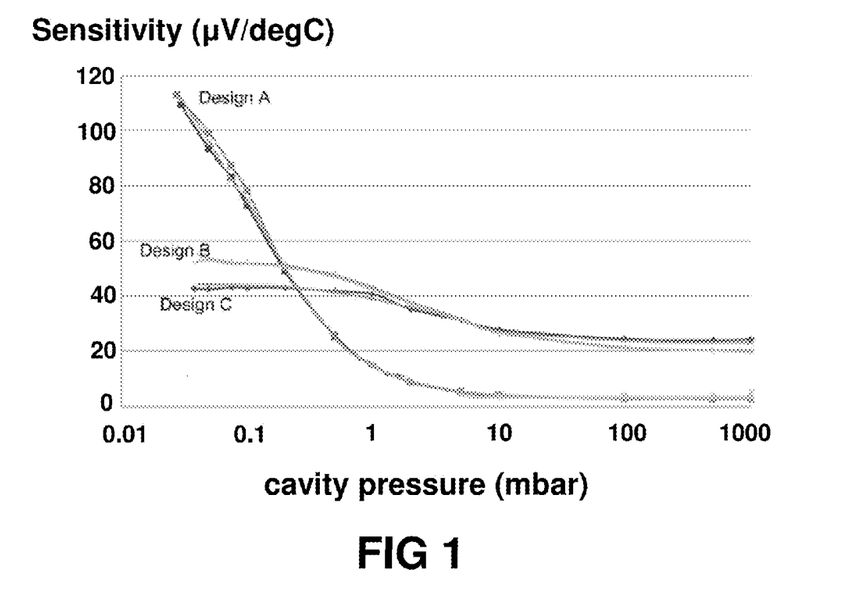
FIG. 1 shows typical sensitivity-curves for different pixel designs A, B, C as a function of the gas pressure in the cavity, illustrating a principle used in embodiments of the present invention.

The stability and linearity of such a sensor clearly depends on the stability and linearity of the different gain factors, and often compromises have to be made between signal amplification and amplification stability. One of the most difficult parameters to control is the heat conduction from the absorber through the gas that surrounds the absorber. At atmospheric pressure (i.e. 1000 mbar) the heat conductance through the surrounding gas usually dominates the heat conductance through the suspension structure, whereas at vacuum (e.g. below 0.05 mbar) the heat transfer through the suspension (beams) dominates and the sensitivity is then maximized by minimizing heat transfer through the surrounding gas. For pressures ranging from about 0.01 to about 50 mbar the sensitivity (of a given pixel design) strongly depends on the gas pressure (as illustrated in FIG. 1). For this pressure range the sensitivity and stability of the sensor is largely dependent on the quality of the manufacturing process which determines the gas pressure and hermeticity of the sensor, in particular the step of bonding the cap to the substrate.

US2007069133 describes a microbolometer IR focal plane array that recognizes the problem of pressure variations in the cavity. It discloses that the pixel element is first used to measure the vacuum level (by a technique that uses active local heating, which is known in the art as a "Pirani measurement"), and once the vacuum level is determined, the measured signal due to the external IR radiation can then be compensated by means of calibration curves.

SUMMARY OF THE INVENTION

It is an object of embodiments of the present invention to provide a good method and a good device for measuring IR radiation, e.g. the amount of power of incident IR radiation.

In particular, it is an object of embodiments of the present invention to provide a method and device for measuring IR radiation using at least two thermal pixels in a cavity at a reduced pressure, with a sensitivity that is substantially independent of pressure inside the cavity.

This objective is accomplished by a method and device according to embodiments of the present invention.

In a first aspect, the present invention provides a semiconductor device for measuring IR radiation originating from outside the device, comprising: a semiconductor substrate with a cap hermetically sealed to said substrate to enclose a cavity at sub-atmospheric pressure; at least one sensor pixel arranged in the cavity, and comprising a first absorber arranged for receiving said IR radiation, and a first heater for increasing a temperature of the first absorber when a first power is applied to the first heater, and first temperature measurement means for measuring the temperature of the first absorber; at least one reference pixel arranged in the cavity, and comprising a second absorber shielded from said IR radiation, and a second heater for increasing a temperature of the second absorber when a second power is applied to the second heater, and second temperature measurement means for measuring the temperature of the second absorber; a control circuit adapted for measuring the first temperature and the second temperature and for generating and applying the first power to the first heater and for generating and applying the second power to the second heater in such a way that the first temperature is substantially equal to the second temperature; an output circuit for generating an output signal indicative of the IR radiation, based on a difference between the second power and the first power.

With "first temperature substantially equal to second temperature" is meant for example that a difference between these temperatures is less than 0.05° C., preferably less than 0.02° C., or less than 0.01° C.

By locating the sensor pixel and the reference pixel in the same cavity, both pixels experience the same gas pressure, and this pressure remains equal over the lifetime of the device, even if the gas pressure would slightly increase over time.

Stated in simple terms, one of the basic ideas underlying embodiments of the present invention is to provide two electrically and thermally matched pixels (except that the sensor pixel is able to receive the IR radiation, while the reference pixel is blind), and that active heating power is applied to both the sensor pixel and the reference pixel in such a manner that the temperature of both pixels is substantially the same. Since only the sensor pixel receives the IR radiation while the reference pixel does not, the incident IR power can be determined as the difference between the heating powers.

It is a major advantage of embodiments of the present invention that the output signal (or output value) indicative for the IR radiation is substantially independent of the pressure inside the cavity, and can be determined even without actually measuring that pressure.

It is an advantage that the output value will remain accurate, even if the pressure in the cavity changes (typically increases) over time, e.g. due to aging. In this way, both the reliability and the useful lifetime of the sensor are considerably increased.

It is an advantage of embodiments of the present invention that the influence of pressure variations and/or other common mode disturbance is suppressed as a common mode signal, which is eliminated by taking the difference of the two power signals.

It is an advantage that no explicit pressure compensation needs to be taken into account when determining the output signal. It is automatically taken into account by the control loop.

It is an advantage of determining the incident IR radiation indirectly, (as a difference between two locally generated power signals), because the generated power signals can be chosen such that they can be more easily "measured", in particular without requiring accurate analog amplification. In this way the linearity of the sensor can be improved.

It is an advantage of embodiments of the present invention over certain prior art devices that also use a sensor pixel and a blind pixel, but where the pixels do not experience the same gas pressure, in that the thermal behavior of those pixels may vary differently over time, which is not the case with the present invention.

It is an advantage of embodiments of the present invention over certain prior art devices that also use a sensor pixel and a blind pixel, but where no active power is delivered to both pixels for keeping their temperatures substantially equal, but wherein the signal of the blind pixel is merely subtracted from the signal of the sensor signal, because (1) it allows an easier and more accurate determination of the difference signal, especially when synchronous pulsed power signals are used, and (2) it offers an additional degree of freedom in that the value of the temperature of the pixels (set Temperature) can be selected or dynamically adjusted depending on the incident IR radiation. For example, it is an advantage that the measurement range can be increased by adapting the modulation depth to the measured signal.

It is an advantage of embodiments of the present invention in that the reference power can be used to monitor the pressure variations inside the cavity over time. This can be used as a quality evaluation of WLP packaged devices.

It is an advantage of embodiments of the present invention over certain prior art devices, in that the first heat pulses are regulated (adapted, modulated) depending on the incoming IR radiation, whereas in some prior art devices, the heat pulses are applied irrespective of the IR radiation, resulting in a higher temperature of the absorber of the sensing pixel, resulting in a higher temperature difference between said absorber and the bulk, in which case the heat flow, hence the thermal behavior of the pixel is dependent on the IR radiation.

It is an advantage of embodiments of the present invention over US2007069133, in that no calibrations curves need to be stored in the device, and in that complicated mathematical calculations using these curves can be avoided.

Preferably the at least one sensor pixel and the at least one reference pixel are arranged on the same substrate, and are encapsulated by a single cap, because in that way the temperature of the direct surroundings of both absorbers is substantially identical.

Preferably the pressure inside the cavity is less than 1 mbar.

In an embodiment, the control circuit is adapted for defining a set temperature, and for generating the first power such that the first temperature is substantially equal to the set temperature, and for generating the second power such that the second temperature is substantially equal to the set temperature.

It should be noted that the set temperature need not be a physical temperature, but may be a hypothetical temperature that is actually implemented by providing a corresponding set voltage. The control circuit can "define" that temperature.

In an embodiment, the control circuit is adapted for defining the set temperature as a constant value above the substrate temperature.

With "constant value above the substrate temperature" is meant e.g. that if the constant value is chosen as 1.0° C., then Tset is about 26.0° C. if Tsub is about 25.0° C., and Tset is about 46.0° C. if Tsub is about 45° C., etc. The difference between the set temperature and the bulk temperature is preferably at least 0.05° C., or at least 0.2° C., or at least 0.5° C., or at least 1.0° C., or at least 2.0° C., or at least 5.0° C.

It is an advantage of keeping the set temperature at a fixed value higher the substrate temperature, because it provides the further advantage of improved linearity, since the temperature difference between the absorbers and its surroundings (lid and cavity) is kept constant, hence the heat flow (due to this fixed temperature difference) from the absorber to the bulk is also constant, and thus independent of the IR radiation.

In an embodiment, the first and the second temperature measurement means are selected from the group consisting of a thermal resistor, a thermocouple, a thermopile and a diode.

It is an advantage of using a thermocouple or thermopile as a temperature measurement means, in that it does not require active power to be delivered to the component, as it generates a (Seebeck) voltage itself. Another advantage of using a thermocouple or thermopile is that the output signal does not have an offset.

Another advantage of using a thermocouple or thermopile is that it does not require a biasing current or biasing voltage to be generated, in contrast to e.g. a diode, where a biasing current is required, which would cause additional heating.

In an embodiment, the first temperature measurement means and the second temperature measurement means is a first respectively second thermocouple or thermopile arranged with its first junction(s) located on the first respectively second absorber and with its second junction(s) located on the substrate.

When the thermocouple(s) or thermopile is arranged in this manner on both pixels, the voltages generated by these thermocouples can be compared to a set voltage (corresponding to a set temperature), and when the voltage of the thermocouple is smaller than the set voltage, more power needs to be delivered.

Other arrangements are however also possible. For example the second junction of the thermocouple(s) of one of the pixels could be located on the other absorber (not on the substrate). As this thermocouple(s) would then measure the temperature difference between both absorbers, its value should ideally be zero. Hence, the control circuit should apply power to this pixel when the signal is smaller than zero (not smaller than the set voltage). An advantage of this arrangement is that the temperature difference between the sensor pixel and the reference pixel is measured directly, which (in theory) is more accurate than measuring the temperature between each absorber and the substrate, and comparing or subtracting them.

In an embodiment, the semiconductor device further comprises a first and/or a second switching circuit comprising a plurality of switches, adapted for configuring the first respectively second temperature measurement means either in a mode for temperature sensing or in a mode for heating.

In this embodiment, the first temperature measurement means and the first heater is effectively one and the same component, e.g. a first thermopile, and the second temperature measurement means and the second heater is also one and the same component, e.g. a second thermopile.

Using separate heaters and temperature sensors has the disadvantage that the thermal resistance between the absorber and the substrate is decreased. By using the temperature measurement means also as heaters offers the advantage that the thermal resistance between the absorber and the substrate is increased, without losing the ability to heat the absorber. By decreasing the thermal resistance the accuracy can be improved.

In an embodiment, the switches are open in the mode for temperature sensing, and closed in the mode for heating.

It is an advantage of such a switch configuration that there is no voltage drop over de switches during temperature sensing, hence the accuracy of temperature sensing is not negatively influenced by the presence of the switches.

In an embodiment, said first respectively second temperature measurement means are said first respectively second heater.

In an embodiment, the first power and the second power is applied by applying a voltage or a current to the first respectively second heater.

Preferably the applied voltage or applied current has a constant amplitude, but is switched ON or OFF over time. The first power signal and the second power signals may e.g. be PWM-signals. Such power signals can easily be generated by switching a voltage or current source. Measurement of such power signals can then be achieved (or determined) by controlling the timing of the signals.

In an embodiment, the control circuit is adapted for receiving a clock signal; and the first power signal is provided as a first pulsed power signal and the second power signal is provided as a second pulsed power signal, both synchronous to the clock signal; and the switches of the switching circuit are operated synchronously to said clock signal.

Such power signal are both easy to generate (with simple logic), and easy to "measure", e.g. by simply counting the number of pulses. A further advantage is that in this way, the signals are automatically digital signals, without requiring an analog-to-digital converter.

By using a clock signal, the timing of the power pulses and the timing of operating the switches can be very easily and elegantly controlled.

In an embodiment, the control circuit comprises a first sub-system for generating and for applying the first power to the first heater and a second sub-system for generating and for applying the second power to the second heater, each sub-system having a comparator, a latch and a gate, and the control circuit does not comprise a programmable processor.

It is an advantage of such a control system that it only requires a few simple components, the linearity of which is not important for the output signal (in contrast to e.g. an analog amplifier). The gate may e.g. be an AND gate or a NAND-gate. The latch may be e.g. an RS flip-flop or a D-flip-flop, or another kind of flip-flop. Such a basic control circuit is easy to design and test, requires less space and power than e.g. a programmable processor. But more sophisticated control circuitry can also be used, for example Sigma-Delta systems, which may offer further improvements on noise reduction.

It is an advantage that the analog circuitry can be drastically simplified as the comparator does not have to be linear, and that the power consumption (for the control circuit) can be reduced. Furthermore, such a circuit can benefit better from down sized submicron CMOS circuitry, especially for arrays where each pixel needs its own amplifier (or rather: comparator).

In an embodiment, the at least two comparators are chopper modulated using the clock signal.

Chopper modulation of the comparators allows to reduce low frequency noise, and to eliminate DC-offset, which leads to an improved overall sensitivity of the IR sensor.

In an embodiment, the output circuit is adapted for generating a digital output signal indicative of the IR radiation based on a ratio between a frequency or count of the second power pulses and a frequency or count of the first power pulses.

In this embodiment, the IR signal to be measured can thus "simply" be determined by counting pulses, determining their ratio, and performing a simple function of that ratio. In a particular embodiment, the incident power can be calculated as $Pir=\alpha\cdot(1-Fs/Fr)$, where $\alpha$ is a constant, which can be determined by calibration. The counter may be considered part of the control circuit, or part of the output circuit.

This has two advantages: (1) the output is digital, hence can be more easily processed (especially when using the pixels for generating image data), (2) the output is proportional to the IR radiation, thus no non-linear function needs to be further applied to convert the output value, hence complex calculations and/or tables can be avoided.

In an embodiment, the semiconductor device comprises: at least one reference pixel and an array of sensor pixels located in the cavity; each of the heaters of the sensor pixels being powered such that the temperature of each absorber of each sensor pixel is substantially equal to the temperature of the absorber of the reference pixel.

It is an advantage of this embodiment that the output of all sensor pixels is independent of the cavity pressure. In addition, it requires much less space than an implementation wherein each sensor pixel has its own reference pixel.

In an embodiment, the semiconductor device comprises an array of sensor pixels arranged between a first and a second reference pixel, each of said sensor and reference pixels being located in the cavity; and each of the heaters of the sensor pixels and each of the heaters of the reference pixels being powered such that the temperature of each absorbers of each sensor pixel and the temperature of each absorber of each reference pixel are substantially equal.

It is an advantage of this embodiment that it allows an improved accuracy in case of a temperature gradient over the substrate. For example, the temperature gradient over the substrate may be avoided by adding substrate heaters. Alternatively or in combination, the gradient value could also be determined (based on the frequency of the power pulses of the reference pixels), and the gradient could be taken in to account when determining the sensor values.

In a second aspect, the present invention also provides an infrared image sensor comprising a semiconductor device according to the first aspect of the present invention.

In a third aspect, the present invention also provides an infrared camera comprising a semiconductor device according to the first aspect of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When in this document reference is made to "IR radiation" or "infrared light", reference is made to electromagnetic radiation with a wavelength between about 700 nm to about 1 mm, but the exact boundaries are not critical for the present invention.

When in this document reference is made to "pixel" or "thermal pixel", reference is made to a heat absorber suspended in a cavity and comprising a temperature measurement means (e.g. in the form of a thermal resistor, or a diode or thermocouple or thermopile). The cavity is typically sealed, and the gas pressure inside the cavity is typically less than atmospheric pressure.

When in this document reference is made to "low pressure", a pressure of less than 5 mbar is meant, unless explicitly mentioned otherwise.

When in this document reference is made to "high pressure", a pressure in the range of 5 mbar to 999 mbar is meant.

When in this document reference is made to "bulk" (or bulk material), reference is made to the "substrate" and/or cap, unless otherwise indicated.

In the present invention, the words "cap" or "lid" are used as synonyms.

When in this document reference is made to "thermal time constant", reference is made to the product of the heat resistance Rth expressed in [K/W] and the heat capacity Cth of the pixel expressed in [J/K]. The time constant is then expressed as Rth·Cth in [sec]. The heat resistance is mainly determined by the heat resistance through the beams of the pixel and the gas inside the pixel. The heat capacity is mainly determined by the mass of the absorber and its specific heat capacity.

Thermal pixels of the kind whereby a so called diaphragm or membrane is located in a cavity formed between a semiconductor substrate and a cap substrate, and is suspended above the substrate by means of a plurality of beams, are well known in the art. Many different designs are possible, e.g. by varying the shape and size of the membrane and/or the cavity, and/or by varying the number of beams, the shape of the beams, the number of thermocouples on the beams, and/or by choosing a relatively low pressure (e.g. about 0.10 mbar), or a relatively high pressure in the cavity (e.g. about 100 mbar). Such different designs are all envisaged within the scope of the present invention.

FIG. 1 shows typical sensitivity-curves of several different pixel designs A, B, C (the details of which are not important for the present invention) as a function of gas pressure in the cavity. The pressure dependence is especially large for design A, which has pixels with high sensitivity at low pressure (e.g. about 110 µV/° C. at about 0.05 mbar), but low sensitivity at high pressure (e.g. about 4 µV/° C. at about 100 mbar). The figure also shows that one has to optimize the design of a pixel for a certain pressure (or pressure range). Unfortunately the pixels with lowest pressure dependence (e.g. design B or C) also have the lowest sensitivity (e.g. about 40 to 55 µV/° C.) at a pressure of about 0.1 mbar.

When using design C and a manufacturing technology which guarantees that the pressure level (or vacuum level) in the cavity is and remains less than 1 mbar during the entire lifetime of the device, it is not required to measure the pressure inside the cavity, since one does not have to compensate for pressure variations over time. However, with design A, one must know the pressure inside the device in order to determine the amount of IR radiation. If the cap is perfectly sealed to the substrate, and remains perfectly sealed thereto during the entire lifetime of the device, the device could be calibrated once during production, and that calibration curve could be used throughout the lifetime of the device.

In practice however, the sealing of the lid or cap to the substrate is not always perfect, and hence small leakage may occur during the lifetime of the device, resulting in a pressure increase in the cavity. In order for the measurements to remain correct, one could use a technique such as the one used in US2007069133 where multiple calibration curves are stored in the device, and whereby the actual pressure in the cavity is measured (in situ) in the device during the lifetime of the product, and whereby the corresponding curve is chosen. The present invention uses a different technique.

Figure 2:
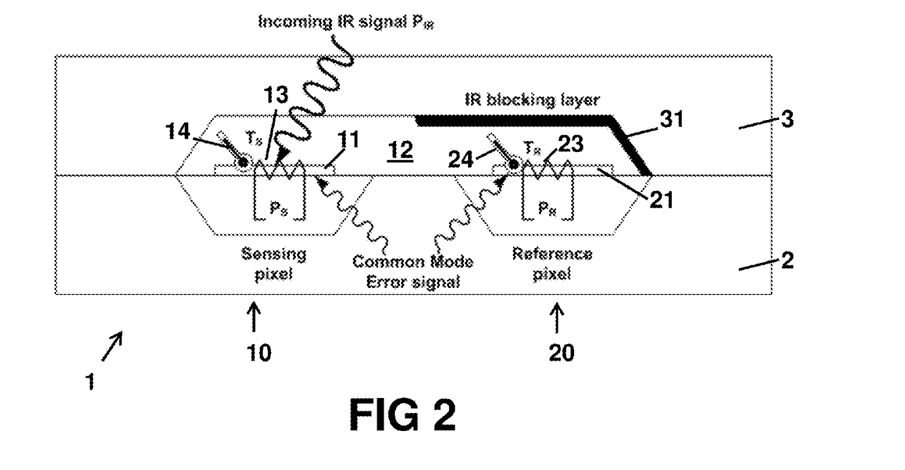
FIG. 2 depicts a schematic cross section of a device according to an embodiment of the present invention, having at least two pixels. The pixel shown on the left (the sensor pixel) is actively heated by a first heater with power Ps and by the incoming IR radiation with power Pir, resulting in a temperature measured as Ts. The pixel shown on the right (the reference pixel) is heated only by a second heater with power Pr resulting in a temperature measured as Tr. The reference pixel is shielded from said IR radiation. The power Ps and Pr are actively controlled such that the temperature of the sensor pixel and the reference pixel are the same. The power of the IR signal can then be determined as the difference between the power Ps and Pr.

FIG. 2 depicts a schematic cross section of (part of) a semiconductor device 1 according to embodiments of the present invention. It shows an infrared (IR) sensor with a sensor pixel 10 and a reference pixel 20 both present in a cavity 12 and thus exposed to the same (albeit unknown) gas pressure. The sensor pixel 10 can receive incoming infrared radiation (with power Pir) through the cap substrate 3, which is (at least partly) transparent to IR radiation, while the reference pixel 20 is deliberately blocked from said incoming IR radiation for example by means of an IR blocking layer 31 which acts as a shield. The cap may e.g. be partly covered with a reflective material, e.g. a metal film layer.

Figure 3:
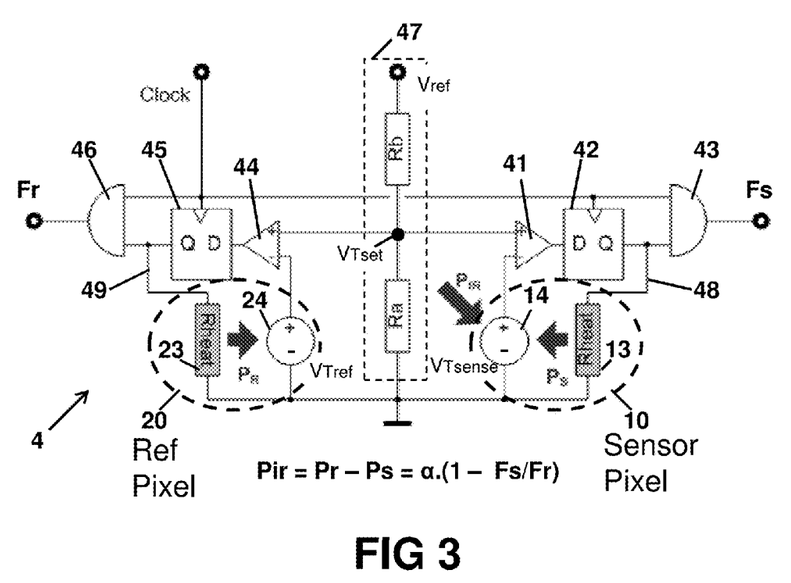
FIG. 3 depicts a possible implementation of a power control circuit as can be used in embodiments of the present invention. It shows two control-loops, one for the sensor pixel (left) and one for the reference pixel (right). The incoming power Pir can then be calculated by determining the difference between the heating power Pr and Ps. If the heating power is furthermore generated as synchronous pulses, the heating by Pr respectively Ps is proportional to the frequency (or count) Fr respectively Fs, which can e.g. simply be measured by means of a digital counter (not shown).

In FIG. 2 the IR blocking layer 31 is positioned on the inside of the cavity 12, but it could also be located on the outside of the cavity 12, or both on the inside and the outside. Both pixels 10, 20 are equipped with heating means 13, 23, e.g. a heat resistor, a diode or a transistor, and with a temperature measurement means 14, 24, e.g. a thermopile (represented schematically by a thermometer). The active heating is organized by a control circuit 4 (an example of which is shown in FIG. 3) in such a way that both pixels 10, 20 are heated to a same temperature Tset above the device temperature Tbulk. In other words, the control circuit 4 measures the temperature Ts of the sensor pixel 10, and the temperature Tr of the reference pixel 20, and generates and delivers a first power Ps to the sensor pixel 10 and a second power Pr to the reference pixel 20, whereby Ps and Pr are chosen such that Ts=Tr=Tset, where Tset is a target temperature. The control circuit 4 may be programmed and/or controlled for performing such actions.

In some embodiments this temperature Tset may be a fixed chosen absolute temperature, such as e.g. Tset=100° C. In other embodiments this temperature Tset may be chosen as a temperature having a fixed (e.g. predefined) temperature difference ΔT above the substrate temperature, e.g. Tset=Tsub+75° C. It is assumed that the substrate 2 and the cap 3 are at a same temperature, referred to herein as the device temperature or bulk temperature.

When exposed to a hot external object (more accurately: to an object having an absolute temperature Tobj higher than the device temperature Tsub), the heater 13 of the sensor pixel 10 needs less power Ps to maintain the temperature Ts of the first absorber 11 at the set temperature Tset, as the sensor pixel is already partly heated by the external object.

As a result the difference in heating power (Pr−Ps) of the two pixels 20, 10 equals the absorbed power Pir of the incoming IR light.

When exposed to a cold external object (more accurately: to an object having an absolute temperature Tobj lower than the device temperature Tsub), the power Ps of the sensor pixel 10 will need to be larger than the power Pr delivered to (and dissipated by) the reference pixel 20. This can be represented in the following mathematical formula:

$$Pir = Pr - Ps \qquad (1),$$

where Pir is the power of the incident IR radiation, Pr is the power delivered to and dissipated by the reference pixel, and Ps is the power to and dissipated by the sensing pixel.

It is noted that this formula applies irrespective of the actual temperature Tsub of the device 1, and especially, irrespective of the pressure inside the cavity 12. It is an advantage of embodiments of the present invention that a measure for the power of the incident infrared radiation can be obtained that is substantially independent of the pressure inside the cavity 12. An increase of the pressure inside the cavity will increase both Pr and Ps, but will not affect the difference Pir.

It is also noted that disturbing IR signals (see FIG. 2 at the bottom) are also suppressed as a common mode signal. Such signals may be generated by objects at the sides and/or under the device and captured by both pixels.

The pixels 10, 20 should advantageously be "matched" as good as possible in both the thermal domain (e.g. same heat capacity) and the electrical domain (e.g. same heater resistance). The easiest way to achieve this is by choosing two pixels having the same (or mirrored) "design" (e.g. same shape, same materials, same dimensions, same suspension beams, same heaters, both arranged on the same substrate 2, both covered by the same cap 3, etc) but especially by being exposed to the same cavity pressure, which is achieved e.g. by placing the pixels under the same cap 3. By doing so, the pixels 10, 20 show the same temperature response to a given amount of heating, they are thermally "matched".

An increase of the gas pressure in the cavity 12 will lower the heat resistance (i.e. increase the heat dissipation) from both absorbers 11, 21 to the bulk in the same manner. The thermal resistance as a function of cavity pressure is the same for both pixels. Hence, the difference in heating (Ps−Pr) due to the incoming IR signal is not influenced by a change in cavity pressure since both powers Ps, Pr increase or decrease in the same manner as a function of the cavity pressure, because the temperature of both pixels is the same. In the rest of this document we refer to this regulation with the term "differential power control".

In case the temperature difference ΔT between the reference pixel 20 and the substrate 2 is kept constant, e.g. equal to 75° C., another advantage of differential power control is that not only the influence of pressure is suppressed but also the temperature dependence of the thermal resistance is suppressed. This feature is especially of interest when the suspension of the pixels 10, 20 contains silicon, since the heat conductivity of (poly)silicon changes by more than −0.3%/° C.

FIG. 3 depicts a simple digital implementation of a differential power control, as can be used as the control circuit 4 for reading the temperatures Ts and Tr and for generating the powers Ps and Pr. However, the invention is not limited to this particular circuit, and other control circuits 4 may also be used.

One such alternative control circuit (not shown) comprises a microprocessor for reading the temperature Ts of the sensor pixel 10 and the temperature Tr of the reference pixel 20, (after amplification and digitization), and for generating two output signals, one for applying power Ps to the heater 13 of the sensor pixel 10, and one for applying power Pr to the heater 23 of the reference pixel 20. It is clear that such as circuit can be much more complex than the simple circuit shown in FIG. 3. In addition, it suffers more from non-linearities, e.g. due to the amplification and digitization (A/D conversion), as will become clear below.

In the circuit of FIG. 3, a (secondary) reference voltage VTset is created by means of the (primary) reference voltage Vref [expressed in V] and a voltage divider 47 consisting of two resistors Ra and Rb. The heating temperature (Tset) is then set at Vref*Ra/(Ra+Rb)/S [expressed in ° C.], where S [expressed in V/° C.] is the sensitivity of the pixels. Hence the circuit 4 does not directly compare temperatures (e.g. if Tr>Tset or Tr<Tset), but actually compares voltages (e.g. if VTref>VTset or VTref<VTset). The primary reference voltage Vref plus voltage divider 47 is one convenient way for selecting (or setting or changing) the predefined temperature Tset. For varying Tset with 1° C., typically the voltage VTset should be varied with only a few mV. If for the primary reference Vref a bandgap voltage is chosen for stability reasons, which is typically a voltage in the range of about 1.0 to about 3.0 volt, the voltage divider (e.g. resistor ladder) can convert this (stable, fixed) bandgap voltage to a lower voltage indicative for the desired reference temperature Tset.

Using a bandgap voltage and voltage divider is, however, not essential for the present invention, and one could also use e.g. a Digital to Analog Converter (DAC) for creating a voltage in the range between 0.0 Volt and 3.0 Volt. A 12 bit DAC would provide steps of about 1 mV.

When using the exemplary control circuit 4 of FIG. 3, the heater 13 of the sensor pixel 10 is powered when the output of the flip-flop 42 is high, i.e. at the rising edge of the clock signal after the output of the comparator 41 is high, and the heater 13 is switched off when the output of the flip-flop 42 is low, i.e. at the rising edge of the clock signal after the output of the comparator 41 is low. Likewise, the heating power Pr delivered to the heater 23 of the reference pixel 20 is switched on when the output of the flip-flop 45 is high, and is switched off when the output of the flip-flop 45 is low, which depends on the output of the comparator 44 at the time of rising clock edges. By using the flip-flops 42, 45 for synchronizing the power Ps respectively Pr, the heating power Ps respectively Pr is proportional to the number of clock pulses during which the heater 13 respectively 23 was powered. The clock period is typically much shorter than the thermal constant of the pixel 10, 20. The output of the comparator 41 goes high when the temperature Ts as measured by the first temperature sensing means 14 (represented by a voltage source indicative for the voltage generated by a thermopile) is lower than a set temperature Tset (represented by the voltage VTset). Likewise, the heater 23 of the reference pixel 20 is powered by a clock synchronized signal 49 when the temperature Tr as measured by the second temperature means 24 is lower than the set temperature Tset, represented by the same voltage VTset. Again, the temperatures Tr and Tset are not compared as such, but instead the voltages VTref and VTset are compared. Thus the reference voltage VTset determines (by means of the control loop as described above) the temperature Tr of the pixel 20, which is identical to the temperature Ts of the sensor pixel 10, since the sensitivity S of the temperature sensors 24 and 14 are matched. When the circuit 4 is in operation, the temperature Tr equals the temperature Ts, which is a temperature above ambient which equals VTset/S.

As can be seen in FIG. 3, the regulation of Tset can e.g. be accomplished by applying the outputs of the first, second temperature measurement means 14, 24 (e.g. voltage generated by a first and second thermopile) to the inverting input of comparators 41, 44, and by applying the reference voltage VTset (corresponding to the set temperature Tset) to the non-inverting input of the comparators 41, 44, and by synchronously latching the outputs of the comparators 41, 44 in flip-flops 42, 45.

In fact, the control circuit 4 would also work by directly providing the output of the comparators 41, 44 to the heaters 13, 24, but it would be much harder (and probably much more inaccurate) to determine the actual power Ps and Pr delivered to the heaters. The advantage of the synchronized clock pulses is clearly that the power Ps and Pr can be determined digitally, e.g. by counting the number of clock periods during which the signals 48 and 49 are high. The skilled person would realize that the outputs of the flip-flops can be "high" (logic 1) or "low" (logic 0) for multiple consecutive clock cycles. In order to allow counting of the clock pulses during which power is actually delivered to the heaters 13, 23, two AND-gates 43, 46 are added for converting multiple consecutive "ones" into a pulsed signal at the output of the AND gates Counter circuitry is very well known in the art, and hence need not be further described here. Nevertheless, control circuits providing a same functionality based on other principles such as Sigma Delta converters are also envisaged for embodiments of the present invention.

In fact, the AND-gates can be omitted if a synchronous counter, using the output of the D-flop-flops as inputs, would be used. In the way shown in FIG. 3 (with the AND-gates), the outputs of the first AND-gate 43 is a first pulse-train having a first frequency Fs proportional to the power Ps applied to the heater 13, and the output of the second AND-gate 46 is a second pulse-train having a second frequency Fr proportional to the power Pr applied to the heater 23. As a result, the pulse rate Fs is an exact measure for the applied power Ps, and the pulse rate Fr is an exact measure for the applied power Pr.

The loop consisting of the thermopile, the comparator, the clocked flip-flop and the heater is a feedback loop in the thermal domain. The linearity of this sub-system is determined by the linearity of the relation of heating as function of the pulse frequency. Therefore the non-linearity of the comparator is not part of the transfer function, which greatly reduces the surface and power consumption of this component. This is a major advantage over a control circuit that uses an amplifier and an ADC convertor.

The time constant of the thermal feedback loop is given by the thermal resistance and heat capacity of the pixel. The pixels 10, 20 can be designed in such a way that the time constant can be in the range of 0.1 to 10 msec. Therefore noise at the input of the comparator 41, 44 at frequencies above the clock frequency is filtered out.

Another advantage of the constant temperature regulation is that the regulation circuit can follow (e.g. measure) temperature changes much faster than given by the thermal time constant, provided the clock period is much smaller than this thermal time constant.

By choosing the clock frequency sufficiently large, e.g. at least 10 times, preferably at least 50 times higher than the 3 db cut off frequency of the thermal low pass filter mainly formed by the thermal heat resistance of the pixel beams and the thermal heat capacitor of the pixel absorber, the fluctuation of the temperature Ts and Tr around Tset can be kept within a small tolerance margin, e.g. as small as +/−0.1° C., or even as +/−0.01° C., or even smaller.

The pulse rate Fr of the power Pr delivered to the heater 23 of the reference pixel 20 is an exact representation of the sum of the heat dissipation of the reference pixel 20 minus the common mode disturbing IR radiation (see FIG. 2 bottom). Likewise, the pulse rate Fs of the power Ps delivered to the heater 13 of the sensor pixel 10 is an exact representation of the sum of the heat dissipation of the sensor pixel 10 minus the common mode disturbing IR radiation minus the incoming IR radiation. Since the pixels 10, 20 are electrically and thermally matched, the difference between the frequencies $\Delta F=(Fr-Fs)$ is thus an exact measure for the incoming IR radiation, caused by the temperature of the external object which is located in view of the sensor pixel 10. $\Delta F$ is positive for objects warmer than the device temperature Tsub. For objects colder than the device temperature Tsub, $\Delta F$ becomes negative. Matching (the materials, the geometry, the dimensions, same substrate temperature, same cap temperature, same cavity pressure, etc) of the sensor pixel 10 and of the reference pixel 20 results in that the sensing and reference pixels show as good as possible the same thermal response to a same amount of heating power, and react the same to disturbing common mode signals. One can say that the pixels are matched in the thermal domain.

An important advantage of the measurement principle as described above, is that the measured value of $\Delta F$, which is representative for the amount of IR radiation originating from the external object, is independent of the actual heating power Pr that was used for heating the reference pixel 20. Thus, when the pressure inside the device increases over the life time, the heat conductivity of the reference pixel 20 increases. This will require an increase of Pr to obtain the set temperature Tset, and thus cause an increase of Fr. But, since the two pixels 10, 20 are exposed to the same internal pressure and have the same thermal behavior, this will also require an increase of Ps by the same amount of power, and cause a corresponding increase of Fs, and thus will not change the IR power Pir, which can be expressed by the following formula:

$$Pir=(Pr-Ps)=\alpha \cdot (1-Fs/Fr) \qquad (2)$$

where $\alpha$ is a constant for the device, the value of which can be determined e.g. by calibration, and is independent of the gas pressure inside the cavity.

Optionally, one can use the signal Fr to monitor the heat conductivity of the reference pixel 20 over the device lifetime, whereby pressure inside the device is probably the most contributing factor.

One can define the ratio of the incoming power Pir originating from the external object and the heating power Pr in the reference pixel 10 as "modulation depth".

$$M=\text{modulation depth}=Pir/Pr \qquad (3)$$

This modulation depth can also be expressed as the temperature increase of the sensor pixel 10 caused by the incoming IR radiation in relation to the power dissipated in the reference pixel, since the reference pixel and the sensor pixel have the same thermal resistance.

When using the control circuit 4 of FIG. 3, the amount of power applied to, and dissipated in the reference pixel 20, is set by the reference voltage VTset (corresponding to a temperature Tset). The modulation depth can then be expressed by:

$$M=\text{modulation depth}=1-(Fs/Fr) \text{ and can be set with } V\text{Tset.}$$

Fr is linearly dependent on VTset as long as we assume that the heat conductivity of the pixels 10 is independent of the pixel temperature, which is only approximately true.

Optionally, instead of using a fixed voltage for VTset, it is also possible to control this reference voltage as a function of another parameter, e.g. to further enhance the overall performance of the control loop. It is of interest to keep the pixel temperature Tr to a fixed value (e.g. 0.1° C.) above the substrate temperature (in the vicinity of the pixel), in order to have a constant heat flow from the pixels 10, 20 to the bulk material (substrate 2 and cap 3). This is especially of interest for arrays of pixels. Often the heat flow is not linearly dependent to the temperature difference between pixel and bulk. When using a fixed reference VTset the pixel temperature (or more correctly: the temperature difference $\Delta T$ above the substrate temperature) is modulated by the temperature dependence of the sensitivity of the temperature measurement means (e.g. thermopile). One could regulate VTset in such a way that said temperature dependence is compensated, such that $\Delta T$ is constant and independent of the ambient temperature.

In case the temperature dependence of the sensitivity of the temperature measurement means 14 (e.g. the thermopile) can be neglected, one can also regulate the reference voltage VTset to vary the sensitivity of the system. For small IR signals the modulation depth M can be increased by decreasing the reference voltage VTset. In fact, the measurement range or modulation depth is determined by choosing a certain reference voltage VTset.

The sensor arrangement is thus based on comparison of the signals of two matched pixels 10, 20, one of which (the sensor pixel 10) receives the IR signal from the outside, while the other (the reference pixel 20) does not. When the pixels are not well matched, errors will be made which all need a specific compensation to avoid sensor instability.

The most inconvenient mismatch of the measurement system is a temperature difference between the sensor pixel 10 and reference pixel 20. Especially when this temperature difference is not constant over the temperature range of the sensor, this difference is partly interpreted as IR signal. In systems where such a mismatch occurs, one advantageously can trim this offset away with an offset for $\Delta F$ if not only the difference in temperature is constant, but also the ratio in heat conductance is constant. Sources for a temperature difference are differences in sensitivity of the thermocouples 14, 24 and offset at the comparators 41, 44.

Differences in sensitivity of the thermocouples are expected to be small because the Seebeck coefficient changes less with doping variation than the resistance of the thermocouples, and because the thermocouples have exactly the same (or mirrored) layout and are placed symmetrically on the absorber. However, different offsets of the comparators 41, 44 cause a temperature difference on the pixels that can only be compensated by offset compensation for the comparators. Therefore it is advantageous—although not essential for embodiments of the present invention—to use chopping techniques or to use one and the same chopped comparator for both pixels. The speed of the sensor is dominated by the thermal time constant, which is typically larger than 100 µsec (microseconds). Therefore the thermal capacitance of the pixels can be exploited for sample and hold of the thermocouple signals for offset filtering.

An offset of the output $\Delta F$ is obtained when the timing or driving voltage of the heater drivers (e.g. the time response of the flip flops and the signals driving the heaters) are not matched, or when the heater resistors are not matched, or when the heat conductivity of the pixels is not matched. A mismatch of heater resistors and heater drivers will result in a constant offset of $\Delta F$, which offset can be determined by calibration, and can be compensated for digitally by signal processing.

A mismatch in heat conductivity will not only result in an offset for $\Delta F$, but also in a shift in sensitivity of the system. However, this shift in sensitivity can also be cancelled digitally by signal processing. It is noted that, in case of a mismatch in heat conductivity of the pixels, the system does not fully compensate for a pressure change. Pixels with a mismatch in heat conductivity will not have a common mode shift with a pressure increase. It is an advantage that the pixels can, according to some embodiments of the present invention, be entirely defined with a high resolution CMOS process and that therefore the heat conductivity will be well matched. One can use the signal Fr to determine the variation of heat conductivity of the pixels. This signal can be used to calibrate the mismatch of sensitivity of the pixels.

Figure 4:
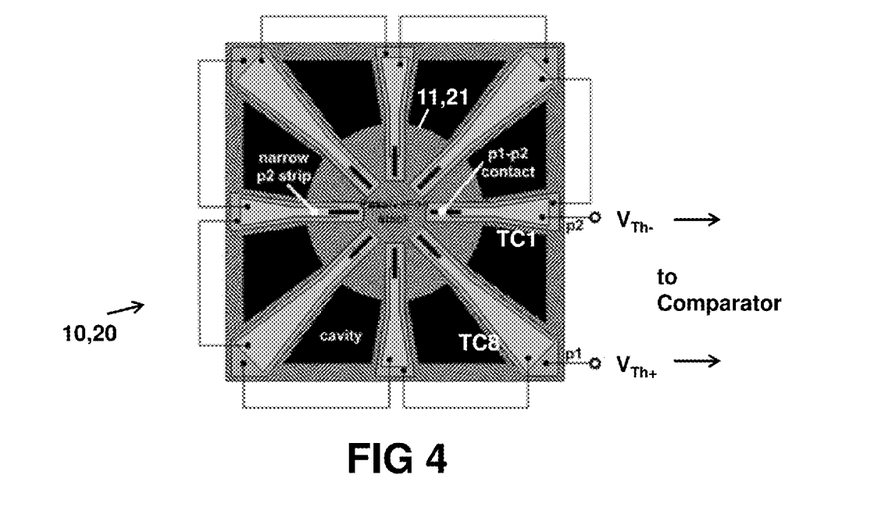
FIG. 4 shows (top view) an example of a thermal pixel as can be used in embodiments of the present invention, whereby the temperature measurement means (here: a thermopile) is selectively used for temperature sensing and for heating.

Although not necessary, it is possible to use the temperature sensing means 14, 24 both for temperature sensing and for heating (albeit not at the same time). This is illustrated in FIG. 4 in case of thermocouples. Separate heaters have the disadvantage that they introduce an additional (conductive) heat path from the absorber 11, 21 to the bulk. By using the electrical resistance of the thermocouples themselves, one can heat the pixel without adding an additional heat conducting path. The heating is then realized by applying a voltage to one or more thermocouples of the thermopile.

In an embodiment, it is proposed to use switches 61, 62 that are open during the temperature measurement phase (in which case the thermocouples are preferably connected in series so as to generate a relatively large voltage value, and so that any voltage drop over the switches does not cause any measurement error), and closed for heating.

The temperature sensing of the pixel cannot be executed at the same time as when the thermocouples are used for heating. The temperature sensing and the heating periods are mutually exclusive, and may be applied in different, e.g. alternating time slots. By choosing the heating periods much shorter than the thermal constant of the pixel, the temperature of the pixel will remain substantially constant over said period. Since the typical heat constant of the pixel is longer than 100 µsec (microseconds) such alternating periods for heating and temperature measurement can easily be obtained. This alteration should be synchronized with the chopping of the comparators, if chopping is applied. The latter (synchronous chopping) is another important aspect of the present invention.

The heating can be concentrated (localized) at the absorber 11, 21 (rather than being spread over the entire length of the thermocouple legs) e.g. by making the thermocouples TC1, TC2, ... TC8 narrower at the absorber side and/or by placing the narrow parts of the thermopiles on the absorber. This is indicated in FIG. 4 with the notion 'narrow P2 strip' (p2 refers to poly2 polysilicon). FIG. 4 shows a schematic layout with a square cavity and a circular membrane (acting as absorber) 11, 21, and with tapered shaped polysilicon structures which can be selectively used for temperature measurement and for pixel heating, whereby most heat dissipation is located at the narrow strip in poly2.

As is well known in the art, a thermocouple typically consists of two thermocouple legs made of a different material. In the example shown in FIG. 4, the membrane 11, 21 is supported by eight beams, and on each beam one thermocouple is mounted such that the two thermocouple legs are located on top of each other. The thermocouple-legs are then interconnected on the substrate. This is known in the art, and hence need not be explained in further detail.

Figure 5:
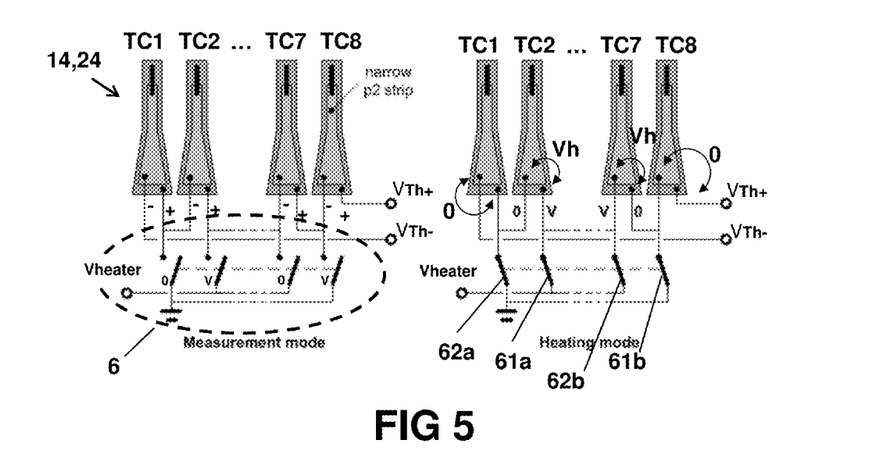
FIG. 5 shows an example of a switching circuit as can be used for configuring the temperature measurement means of FIG. 4 in a temperature measurement mode (left) or in a heating mode (right).

FIG. 5 shows the basic idea for an additional switching circuit 5 for configuring the thermocouples of FIG. 4 either for temperature sensing or for heating. Instead of applying a heating voltage over the end terminals of the thermopile, the electrical impedance of the "heat resistance" can be reduced, by using a plurality of switches 61, 62 that place one or more thermocouples of a thermopile in parallel during the heat cycle only. This offers the following advantages: (1) no extra heaters are required, only thermocouples (which were present already for temperature measurement) and switches (which are not located on the beams), thus the thermal resistance between the absorber 11, 21 and the substrate is not increased, (2) the electrical voltage generated by the thermopile is maximal during temperature sensing mode, by placing all thermocouples in series in this mode, (3) the electrical (heating) power is increased during the heating mode, by placing at least some of the thermocouples in parallel.

In the measurement mode (FIG. 5 left), all switches are open, and all thermocouples TC1 to TC8 are connected in series, as if there were no switches. It is an advantage that the switches do not influence the voltage generated by the thermopile in this mode, as compared to a switching circuit where switches would be connected in series with the thermocouples, or in series with the readout terminals VTh−, VTh+.

In the heating mode (FIG. 5 right), the switches 61, 62 are closed, thereby applying a heating voltage Vheater over all thermocouples except the first thermocouple TC1 and the last thermocouple TC8 of the chain, for reasons that will be explained below. By doing so, the voltage Vheater is applied to each of the thermocouples TC2 to TC7, each of which will then act as a heater. However, the invention is not limited to this configuration, and other configurations for switching may also be used.

In an alternative switch circuit (not shown), the heating voltage Vheater was applied to all the thermocouples TC1 to TC8, in which case stability of the control system (see FIG. 3) might require that the outputs of the thermocouple VTh−, VTh+ are disconnected from the comparators 41, 44 during the heating cycle. However, the inventor realised that placing switches (not shown) between the output terminals of the thermopiles and the inputs of the comparators 41, 44 would introduce a voltage drop (over the closed switch) during the temperature measurement phase, and thus introduce inaccuracies. To avoid this, the inventor came to the idea (see FIG. 5 right), according to a particular embodiment, of not applying the heater voltage over the thermocouple legs of the first and last thermocouple TC1, TC8 of the thermopile, but to switch them to ground during heating. This has the advantage that switches placed between the thermopile (in particular between the nodes indicated by Vth− and Vth+) and the inputs of the comparators 41, 44 can be avoided.
Variants:

The same principles as explained above can of course also be applied to a semiconductor device 1 having more than one sensor pixel 10, but for example a one-dimensional or two-dimensional array of sensor pixels 10.

One could for example provide one reference pixel 20 for each sensor pixel, and arrange them in couples of a sensor pixel 10 and a reference pixel 20 in the same way as described above (i.e. in a cavity, at the same pressure, matched, the reference pixel not receiving the IR radiation, etc). The total number of pixels would then be 2N for N sensor pixels.

It would also be possible to combine the one-dimensional array of N sensor pixels with only a single reference pixel, whereby all of the N sensor pixels of the one-dimensional array are at the same internal pressure with said single reference pixel. This embodiment would work in the same way as described above. If the control circuit of FIG. 3 would be used, it would have one comparators 41 and one flip-flop 42 and one AND-gate 43 per sensor pixel, but only a single comparator 44, a single flip-flop 45 and a single AND-gate 46 for the single reference pixel 10. The voltage VTset would be applied to each sub-circuit. The total number of sub-circuits (comparator+flip-flop+AND-gate) would then be N+1 for N sensor pixels. This embodiment saves a lot of space as compared to the previous embodiment, yet has all the advantages mentioned above (mainly: independent of cavity pressure).

As an alternative to the previous embodiment, it would also be possible to combine the one-dimensional array of N sensor pixels with exactly two reference pixels, the reference pixels being arranged at opposite sides of the sensor pixels so that the sensor pixels are arranged between the two reference pixels. All of the N sensor pixels being at the same pressure as both reference pixels. Also this embodiment would work in the same way as described above. If the control circuit of FIG. 3 would be used, it would have one sub-circuit with a comparator 41, a flip-flop 42 and an AND-gate 43 per sensor pixel 10, and one sub-circuit 44, 45, 46 for each of the two reference pixels 10. The voltage VTset would be applied to each sub-circuit. The total number of sub-circuits (comparator+flip-flop+AND-gate) would then be N+2 for N sensor pixels. When compared to the previous embodiment, this embodiment requires slightly more space for the extra reference pixel, but offers the additional benefit of canceling the influence of a temperature gradient. It should be mentioned in this case that the output signal of each sensor pixel could be calculated as:

$$P_{ir,i} = \alpha \cdot (1 - F_{s,i}/F_{r,1}) \text{ for } i=1 \text{ to } N,$$

whereby only the frequency $F_{r,1}$ of the first reference pixel is used. Or one could use e.g. $F_{r,1}$ for half of the sensor pixels (i=1 to N/2), and $F_{r,2}$ for the other half of the array (i=N/2+1 to N). Or one could calculate the output value of each sensor pixel as a weighted average depending on the distance of the particular sensor pixel in the array to the reference pixels. The latter may be more accurate in case of a temperature gradient.

Of course the same principles can also be extended to a two-dimensional group of sensor pixels, e.g. an array of M rows of N pixels each. Similar as above, one could arrange the two-dimensional M×N sensor as M one-dimensional arrays having N+1 pixels (as described above), whereby the pixels of each one-dimensional array are arranged to experience the same pressure, but pixels from different one-dimensional arrays are not. Similarly, the M×N sensor could also be organized as M one-dimensional arrays having N+2 pixels (as described above).

It would also be possible to arrange the M×N array as a two-dimensional array of M×N sensor pixels all being arranged to experience the same pressure as 1 reference pixel, or with more than one reference pixel, for example two, or one per row (i.e. N reference pixels), or one per column (i.e. M reference pixels), or two per row (i.e. 2N reference pixels), or two per column (i.e. 2M reference pixels), or one per row and per column (i.e. 2M+2N reference pixels), or one per row and per column and in the four corners (i.e. 2M+2N+4 reference pixels), all being arranged to experience the same pressure.

For linear gradient compensation it would be sufficient to only place reference pixels in the corners of the matrix.

The invention claimed is:

1. A semiconductor device for measuring IR radiation originating from outside the device, comprising:
   a semiconductor substrate with a cap hermetically sealed to said substrate to enclose a cavity at sub-atmospheric pressure;
   at least one sensor pixel arranged in the cavity, and comprising a first absorber arranged for receiving said IR radiation, and a first heater for increasing a temperature of the first absorber when a first power is applied to the first heater, and a first temperature sensor that measures the first temperature of the first absorber;
   at least one reference pixel arranged in the cavity, and comprising a second absorber shielded from said IR radiation, and a second heater for increasing a temperature of the second absorber when a second power is applied to the second heater, and a second temperature sensor that measures the second temperature of the second absorber;
   a control circuit that measures the first temperature and the second temperature and that generates and applies the first power to the first heater and that generates and applies the second power to the second heater in such a way that
      the first temperature is equal to the second temperature, or
      the difference between the first temperature and the second temperature is less than 0.05° C.;
   an output circuit for generating an output signal indicative of the IR radiation, based on a difference between the second power and the first power.

2. The semiconductor device according to claim 1, wherein the control circuit is adapted
   for defining a set temperature, and
   for generating the first power such that
      the first temperature is equal to the set temperature, or
      the difference between the first temperature and the set temperature is less than 0.05° C., and
   for generating the second power such that
      the second temperature is equal to the set temperature, or
      the difference between the second temperature and the set temperature is less than 0.05° C.

3. The semiconductor device according to claim 2, wherein the control circuit is adapted for defining the set temperature as a constant value above the substrate temperature.

4. The semiconductor device according to claim 1, wherein the first temperature sensor and the second temperature sensor are selected from the group consisting of a thermal resistor, a thermocouple, a thermopile and a diode.

5. The semiconductor device according to claim 4, wherein the first temperature sensor is a first thermocouple or thermopile arranged with a first junction located on the first absorber and with a second junction located on the substrate, and
   wherein the second temperature sensor is a second thermocouple or thermopile arranged with first junction located on the second absorber and with a second junction located on the substrate.

6. The semiconductor device according to claim 1, further comprising a first and/or a second switching circuit comprising a plurality of switches, wherein the first and/or second switching circuits are adapted for respectively configuring the first and second temperature sensor either in a mode for temperature sensing or in a mode for heating.

7. The semiconductor device according to claim 6, whereby the switches are open in the mode for temperature sensing, and closed in the mode for heating.

8. The semiconductor device according to claim 6, wherein said first temperature sensor is said first heater and said second temperature sensor is said second heater.

9. The semiconductor device according to claim 6,
   wherein the control circuit is adapted for receiving a clock signal; and
   wherein the first power signal is provided as a first pulsed power signal and the second power signal is provided as a second pulsed power signal, both synchronous to the clock signal; and
   wherein the switches of the switching circuit are operated synchronously to said clock signal.

10. The semiconductor device according to claim 9, wherein the output circuit is adapted for generating a digital output signal indicative of the IR radiation based on a ratio between a frequency or count of the second power pulses and a frequency or count of the first power pulses.

11. The semiconductor device according to claim 1, wherein the first power is applied by applying a first voltage or a current to the first heater and the second power is applied by applying a second voltage or a current to the second heater.

12. The semiconductor device according to claim 1, wherein the control circuit comprises a first sub-system for generating and for applying the first power to the first heater and a second sub-system for generating and for applying the second power to the second heater, each sub-system having a comparator, a latch and a gate, and wherein the control circuit does not comprise a programmable processor.

13. The semiconductor device according to claim 12, wherein the at least two comparators are chopper modulated using the clock signal.

14. The semiconductor device according to claim 1,
   wherein the semiconductor device comprises at least one reference pixel and an array of sensor pixels located in the cavity; and
   wherein each of the heaters of the sensor pixels are powered such that
      the temperature of each absorber of each sensor pixel is equal to the temperature of the absorber of the reference pixel, or
      the difference between the temperature of each absorber of each sensor pixel and the temperature of the absorb of the reference pixel is less than 0.05° C.

15. The semiconductor device according to claim 1,
   wherein the semiconductor device comprises an array of sensor pixels arranged between a first and a second reference pixel, each of said sensor pixels and reference pixels being located in the cavity; and
   wherein each of the heaters of the sensor pixels and each of the heaters of the reference pixels are powered such that
      the temperature of each absorber of each sensor pixel and the temperature of each absorber of each reference pixel are equal, or
      the difference between the temperature of each absorber of each sensor pixel and the temperature of each absorber of each reference pixel is less than 0.05° C.

16. An infrared image sensor comprising a semiconductor device according to claim 1.

17. An infrared camera comprising a semiconductor device according to claim 1.

18. The semiconductor device according to claim 1, wherein the control circuit generates and applies the first power to the first heater and generates and applies the second power to the second heater in such a way that
the first temperature is equal to the second temperature, or the difference between the first temperature and the second temperature is less than 0.02° C.

19. The semiconductor device according to claim 1, wherein the control circuit generates and applies the first power to the first heater and generates and applies the second power to the second heater in such a way that
the first temperature is equal to the second temperature, or the difference between the first temperature and the second temperature is less than 0.01° C.

20. A semiconductor device for measuring IR radiation originating from outside the device, comprising:
a semiconductor substrate with a cap hermetically sealed to said substrate to enclose a cavity at sub-atmospheric pressure;
at least one sensor pixel arranged in the cavity, and comprising a first absorber arranged for receiving said IR radiation, and a first heater for increasing a temperature of the first absorber when a first power is applied to the first heater, and a first temperature sensor that measures the first temperature of the first absorber;
at least one reference pixel arranged in the cavity, and comprising a second absorber shielded from said IR radiation, and a second heater for increasing a temperature of the second absorber when a second power is applied to the second heater, and a second temperature sensor that measures the second temperature of the second absorber;
a control circuit that measures the first temperature and the second temperature and that generates and applies the first power to the first heater and that generates and applies the second power to the second heater in such a way that the at least one sensor pixel thermally matches the at least one reference pixel; and
an output circuit for generating an output signal indicative of the IR radiation, based on a difference between the second power and the first power.

* * * * *